Feb. 7, 1956 P. T. MINER 2,733,598
MEASUREMENT OF SURFACE FINISH
Filed July 2, 1951 4 Sheets-Sheet 1

INVENTOR.
Philip T. Miner

Feb. 7, 1956  P. T. MINER  2,733,598
MEASUREMENT OF SURFACE FINISH
Filed July 2, 1951  4 Sheets-Sheet 3

INVENTOR.
Philip T. Miner

Feb. 7, 1956  P. T. MINER  2,733,598
MEASUREMENT OF SURFACE FINISH
Filed July 2, 1951  4 Sheets-Sheet 4

INVENTOR.
Philip T. Miner

United States Patent Office 2,733,598
Patented Feb. 7, 1956

2,733,598

MEASUREMENT OF SURFACE FINISH

Philip T. Miner, Dallas, Tex., assignor to Kota-Meters, Inc., Dallas, Tex., a corporation of Texas Application July 2, 1951, Serial No. 234,877

3 Claims. (Cl. 73—105)

This invention relates to measurement of surface finish and more particularly to a system that is readily adaptable accurately to measure the finish of a surface without regard to its location or orientation.

Since the finish of a surface is directly related to its tendency to withstand or to accelerate wear, much attention and effort has been devoted to its measurement. In tracer methods the magnitude of irregularities normal to the surface is ordinarily taken as a measure of finish or surface character. Since surface variations in the microinch range may reoccur from intervals of the same order as the height dimension (a rough surface) to intervals many times such dimension (a wavy surface) great difficulty is encountered in producing with one instrument a reliable measurement of types all surfaces. The problem is primarily of calibration with due regard to surface type. A tracer point propelled across and in contact with a surface may experience undulations normal to the surface of many different frequencies. The portion of the spectrum that should be utilized is subject to controversy for the reason that a surface may be either rough or wavy depending upon the type of finishing operation it represents.

Surface finish measurement generally has been approached from one of two points of view: (1) To measure the finish directly with a machine; or (2) Compare the finish with that of a prepared or known standard. In accordance with the present invention, an approach combining the above is followed whereby there is utilized a machine that is readily calibrated to a given surface type and which then reliably measures to a high degree of accuracy and in a reproducible manner the finish of other surfaces the type for which it is calibrated.

In accordance with the present invention, a device for measuring the smoothness or roughness of a surface is provided which is physically small and readily portable. The device, including a frame member and a stylus, is adapted to rest upon the surface to be studied. The stylus is supported from the frame by a carriage movably mounted on the frame. Resilient means engaging the frame and the stylus member maintains a point contact between the stylus and the surface. Driving means coupling the carriage and the frame produces relative movement between the carriage and frame to propel the stylus along a line of given length on the surface. Means responsive to relative movement between the stylus and the carriage produces for measurement a voltage dependent upon the surface finish.

In accordance with a further aspect of the invention, it is to be recognized that the smoothness or roughness of a surface may be measured by taking into consideration the frictional forces experienced by a moving point contact. Since the frictional force depends not only upon the magnitude of the surface variations, but also upon the rate of reoccurrence of such variations, and the character of the variations, measurement of such frictional force has been found to be a more readily reproducible indicia of surface measurement then measurements dependent upon magnitude alone.

Thus, in accordance with this aspect of the invention, a point contact is established onto the surface to be studied and while the force normal to the surface at the contact is maintained constant, a second force constant in magnitude is applied parallel to the surface to move with constant velocity the contact along a selected traverse. The force opposing movement, developed by friction and causing variations in velocity of the contacting point along the traverse is measured for a preselected portion of the traverse. Material to obtaining a reliable measurement is maintaining constant the two forces while providing a versatile, readily movable, physically small unit suitable for universal surface studies.

For a more complete understanding of the present invention and for further objects and advantages thereof, reference may now be had to the following description taken in conjunction with the accompanying drawings in which.

Figure 1:
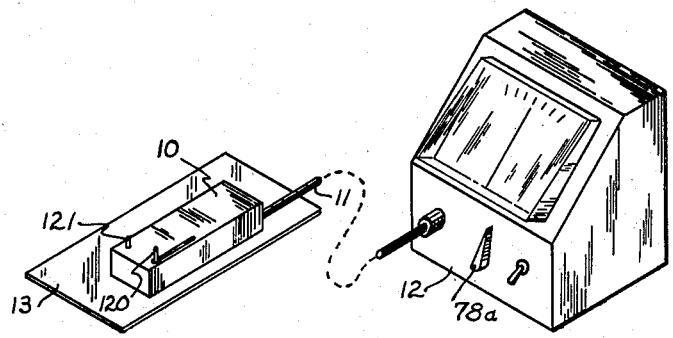
Fig. 1 is a perspective view illustrating the manner of carrying out the present invention.

Referring now to Fig. 1, a probe unit 10 is connected by a cable 11 to a meter 12. The probe 10 rests upon a plate 13 whose surface character is to be measured. An important feature of the present invention is the structure and arrangement of parts that admits of a probe unit that is physically small and cable connected to the metering device 12. The surface under study is the base or support for the probe unit which permits surface measurement at points remote from the metering device. Another important feature, as will hereinafter appear, is the ready adaptability of the probe to surface measurement without regard to orientation of the surface. The surface may be horizontal, vertical, or at angles intermediate thereto.

Figure 2:
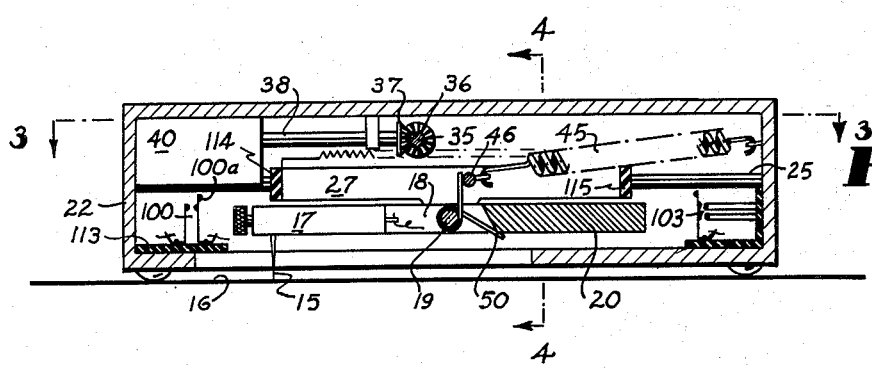
Fig. 2 is a sectional view of the probe unit of Fig. 1 taken along the line 2—2 of Fig. 3.
Figure 3:
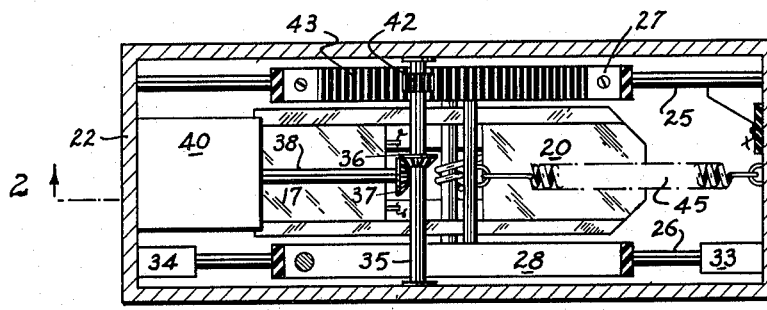
Fig. 3 is a sectional view of the probe unit taken along line 3—3 of Fig. 2.
Figure 4:
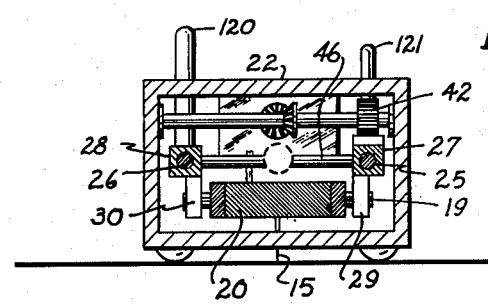
Fig. 4 is a sectional view of the probe unit taken along line 4—4 of Fig. 2.

Details of the probe structure, in a preferred embodiment of the invention are illustrated in Figs. 2-4 in which variation in the frictional force on a stylus is measured.

Referring first to Fig. 2, a stylus or tracer point 15, in contact with the surface 16 is carried by a detector unit 17 which may be a crystal pickup. The crystal unit 17 is supported at one end of a beam 18 that is pivotally supported on a shaft 19.

The beam 18 also includes a counterweight section 20, and is so shaped and oriented that the center of gravity of the entire beam structure is at the axis of shaft 19 so that beam 18 is at least statically balanced and preferably is dynamically balanced.

The shaft 19 is mounted for movement lengthwise of the housing 22 of the probe 10. More particularly, two track members 25 and 26, (best seen in Figs. 3 and 4), extend lengthwise of the housing 22 and support carriage members 27 and 28 respectively. As seen in Fig. 4, carriage member 27 has a depending arm 29 in which one end of shaft 19 is journaled while carriage member 28 has a similar arm 30 supporting the other end of shaft 19. The carriage members together with beam 18 are movable lengthwise of the track members 25 and 26 within the limits of the stops 33 and 34 carried by the track member 26.

A shaft 35 journaled at its extremities in the walls of the housing 22 above the carriage members 25 and 26 carries a bevel gear 36 which meshes with a similar bevel gear 37 on shaft 38. A gear-air escapement device represented by the block 40 is coupled to shaft 38 and, as hereinafter explained, controls the speed thereof. A pinion 42, also carried by shaft 35 meshes with a rack 43 which is carried by the carriage member 27.

A tension spring 45 is connected at one end to a rod 46 which interconnects the carriage members 27 and 28, and at the end to the end of the case 22. Spring 45 tends to move the supported beam 18 to the right. Additionally a coil spring 50 carried by the shaft 19 at a central cut-away portion of the beam 18 applies a rotational force to the beam in a counterclockwise direction forcing the stylus 15 down onto surface 16.

From the foregoing it will be seen that (1) the stylus carrying beam 18 is dynamically balanced and is mounted for travel over the surface 16; (2) coil spring 50 maintains a constant force on the stylus in order to maintain a substantially constant force normal to surface 16 at the contact point; and (3) the elongated tension spring 45 and the gear-air escapement mechanism 40 coupled to the beam-carried stylus system move the stylus over the surface at a constant average velocity. Relative movement between the end of the stylus and the beam 18 may then be utilized to produce a voltage or an electrical circuit change that is a measure of the surface finish.

Figure 5:
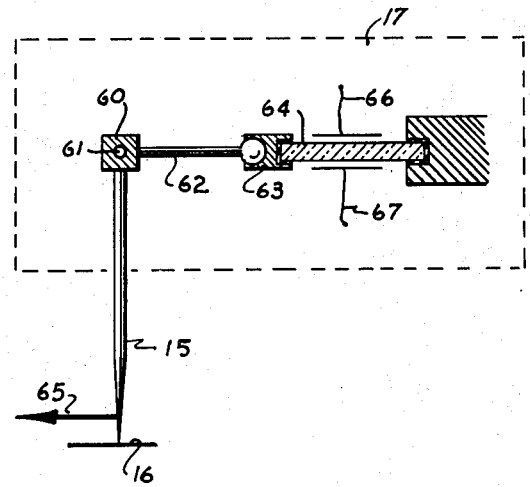
Fig. 5 illustrates details of one form of crystal unit.

One manner of effecting an operative mechanical connection between the stylus 15 and a crystal element is illustrated in Fig. 5. With such a system, variations in the relative position of the point of the stylus 15 and a shaft 61 directly proportional to the horizontal force, produces an output voltage proportional in magnitude to said frictional force.

More particularly the stylus 15 is mounted in a head 60 which is pivoted on shaft 61. Shaft 61 is mounted on and supported by the beam structure 18. An arm 62 rigidly connected to the head 60 is articulated in a socket member 63 which in turn is coupled to a crystal 64 cantilever mounted at one end in and extending from the beam structure 18 towards shaft 61.

The presence of a frictional force between stylus 15 and surface 16 as the stylus is moved over the surface changes the relative positions of shaft 61 and the point of stylus 15, rotating the stylus in the direction of arrow 65. The resultant stress on crystal 64 produces a voltage which appears between the contacting leads 66 and 67.

As will now be explained in connection with Fig. 6, the voltage from the crystal unit 17 preferably is utilized during travel of the stylus over a selected length of its traverse to produce an output indication that is the integral of the frictional force during the selected portion of the traverse.

Figure 6:
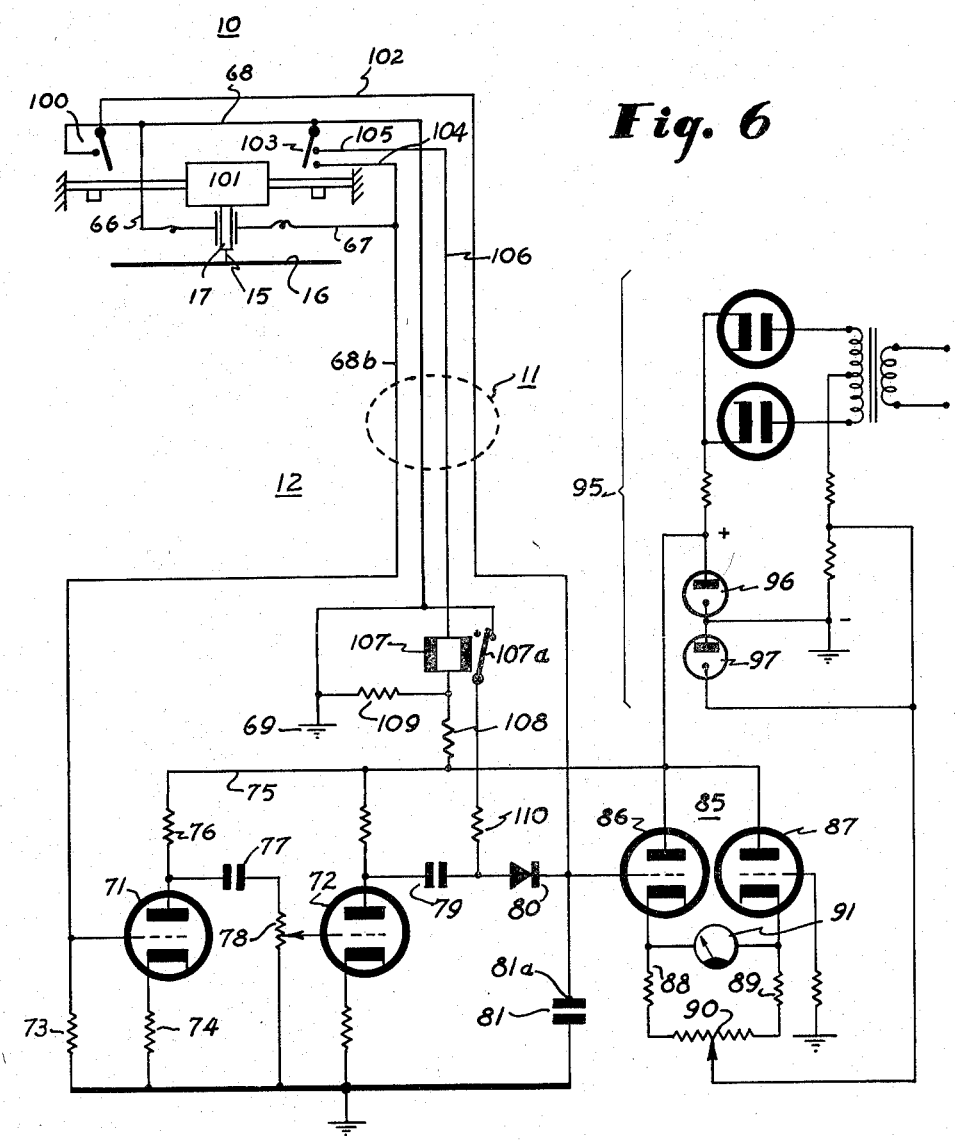
Fig. 6 is a circuit diagram of the system.

More particularly, referring now to Fig. 6 the contacting lead 66 of the crystal unit 17 is connected by way of conductor 68 (forming a part of cable 11) to an electrical ground 69, while contacting lead 67 is connected by way of conductor 68b to the input grid of an amplifier circuit. The amplifier circuit includes tubes 71 and 72. The grid of tube 71 is connected to ground by way of a resistor 73 and the cathode is connected to ground by way of a resistor 74. The anode is connected to the B— bus 75 by way of resistor 76. The anode is also connected through the condenser 77 to the grid resistor (potentiometer) 78 of the tube 72. The circuit of tube 72 is similar in construction and operation with that of tube 71 and together with tube 71 serves to amplify the voltage output from crystal 17. The output of tube 72 passes through coupling condenser 79 to a rectifier 80 whose output is applied to the condenser 81.

The circuit above described controls the magnitude of the charge on condenser 81, the output of tube 72 thus being integrated, for a selected interval of time, the integral of the output appearing as the ultimate voltage across condenser 81. This voltage as above indicated is directly proportional to the frictional force experienced by the probe 15 as it is driven across a surface.

The circuit 85 is a balanced bridge vacuum tube voltmeter in which tubes 86, 87, and resistors 88, 89 and the potentiometer 90 comprise the bridge arms. The meter 91 connected across the output diagonal to the bridge is actuated in direct proportion to the voltage across condenser 81.

The circuit 95 produces the B— supply voltage necessary for the operation of the amplifier and the voltmeter. It is conventional in construction and operation, being provided with voltage regulator tubes 96 and 97 more closely to regulate the D. C. output voltage. While the system is thus capable of operating from an A. C. power source, it will be apparent the power supply may be in the form of batteries for D. C. operation.

It will be understood that in operating the probe unit 10 the output of crystal 17 is permitted to affect the magnitude of the charge on condenser 81 only during a preselected portion of the traverse of the stylus 15. The operation is such that the probe may be placed upon the surface and actuated for a single traverse across the surface to produce a voltage on condenser 81 indicated and measured by meter 91 and that for repeated operations the condenser 81 will be discharged prior to any further traverse so that each operation effectively is a separate sampling of the character of the surface under study.

In each case it is assured that initially there is zero charge on condenser 81 and that at the end of the preselected portion of the traverse there will be a surface roughness dependent charge on condenser 81 and that the output of the crystal for further portions of the traverse will not alter or affect the condenser so that the magnitude of the charge produced on the condenser 81 during the selected portion of the traverse will thereafter remain constant and fixed for observation. The circuit arrangement for controlling the action of the probe is illustrated in Fig. 6 and includes a first switch 100 which is normally open and which is closed by coaction with the carriage 101 as it approaches the left end of its traverse. The stationary contact is connected by way of conductor 68 to the ground terminal 69. The movable contact is connected by way of conductor 102 to the terminal 81a of the condenser 81. Thus at the left end of the probe 10 the carriage 101 closes switch 100 to short the condenser directly to ground so that the charge thereon will be removed.

A similar switch 103 is located near the right hand end of the traverse of carriage 101 and includes a movable switch arm which is controlled by the carriage 101. The movable arm is connected directly to the ground conductor 68. A first contact 104 associated with switch 103 is connected to conductor 68b which leads to the input of the tube 71. A second contact 105 is connected by way of conductor 106 to one terminal of a single pole single throw relay 107. The second terminal of relay 107 is connected to the B+ bus 75 by way of resistor 108 and is connected by way of resistor 109 to the ground terminal 69. Resistors 108 and 109 form a voltage dividing circuit for proper operation of relay 107 when switch 103 is closed.

In operation the carriage 101 starts at its left hand position with the condenser 81 short circuited. As it moves to its right hand position switch 100 is allowed to open and then switch 103 is closed to ground by way of conductor 68 and also to close the energizing circuit for the relay 107. Whereupon the armature 107a of the relay 107 is actuated to open the circuit including the relay arm 107a and resistor 110 between ground 69 and the point intermediate of condenser 79 and the rectifier 80. In the latter condition the condenser 81 is connected only to extremely high impedance circuits (the condenser 79, rectifier 80, and input to tube 86) so that the charge remains constant thereon. The magnitude of the charge will then be indicated directly for sustained periods on the meter 91.

While in Figs. 2–4 the cable 11 and the conductors associated with switches 100 and 103 have been omitted in order to avoid undue confusion, the switch structures are illustrated. Referring to Fig. 2, the switch 100 includes two resilient members supported from an insulating base 113. The movable contact 100a is elongated to extend up and into the path of the carriage member 27 so that the carriage approaches the left end of the probe, the member 100a is driven into contact with the second member. The switch 103 similarly has the movable member extending up into the path of the carriage member 27 for closure of its associated circuits when the carriage approaches the right end of the probe. Insulating washers 114 and 115 are illustrated as attached to the ends of the carriage member 27 to provide a contacting area for the movable members of the switches 100 and 103.

While the probe has been described in some detail there has been omitted thus far any reference to the triggering end resetting members by which the carriage supported beam 18 as viewed in Fig. 2 may be moved to its left hand position and there restrained as against the tension of the spring 45 until it is desired to permit traverse of the point 15 across the surface. While they are not shown in detail, a reset pin 120 is illustrated as extending through the upper face of the probe unit 10 (Figs. 1 and 4). It will be seen, particularly in Fig. 4, that the pin 120 is coupled to the carriage member 28. In Fig. 1 it will be noted that pin 120 extends through an elongated slot whereby it may travel back and forth with the carriage inside the probe. A latch pin 121 is also illustrated as extending through the upper surface of probe 10 and is provided by means (not shown but readily understood by those skilled in the art) as to engage some portion of the carriage when it occupies its extreme left hand position. Upon release the carriage may travel under the pull of the spring 45 to its right hand position. Details of the latching member have been omitted since the desired function may be performed by many relatively simple forms or devices.

In order to make accurate and reproducible measurements it is desirable to drive the stylus supporting beam 18 at a constant velocity. The switches 100 and 103 preferably are located as to make and break contact only when the carriage structure has moved a substantial distance from the limits of its traverse. Thus, although the carriage must accelerate and decelerate at the ends of its traverse, the associated circuits will be actuated only during the constant velocity portion of the traverse.

The gear-air escapement device 40 operates in conjunction with the spring 45 to effect constant velocity of the carriage. The device 40 may be of the type commonly embodied in camera shutter structures. Such a device is particularly suitable for the present system, being adapted to produce short repeated, constant linear velocity or constant rotational motions. The shaft 38 coupled to the device 40 rotates at constant speed, permitting the carriage to travel under the pull of spring 45 at a velocity determined entirely by the device 40.

While the foregoing description relates specifically to preferred form of the invention in which the frictional force on the stylus is measured, it will be apparent that variations in position of the stylus normal to the surface may be utilized. In such case a suitable detector or transducer would be movably mounted in the frame for operation substantially as above outlined. For either type detector element, the probe may be calibrated to a known surface sample in order to produce a reliable comparison of the finish of the sample surface and any other surface. In measurement of the absolute values of surface variations of course, it must be appreciated that tracer point devices must be calibrated to some standard. Insofar as the type of surface on a standard is the same as that under study, and insofar as the absolute values of surface height variations on the standard are known, measurements made in accordance with the present invention may be relied upon to indicate the absolute magnitude of surface height variations.

Calibration, in the system of Fig. 6, is accomplished by adjusting the position of the contact on grid potentiometer 78 to bring the pointer on the meter 91 to a scale position related directly, or by a suitable conversion factor, to the magnitude of height variation on a standard. To facilitate calibration, a suitable control 78a, Fig. 1, is provided on the panel of metering device 12.

Figure 7:
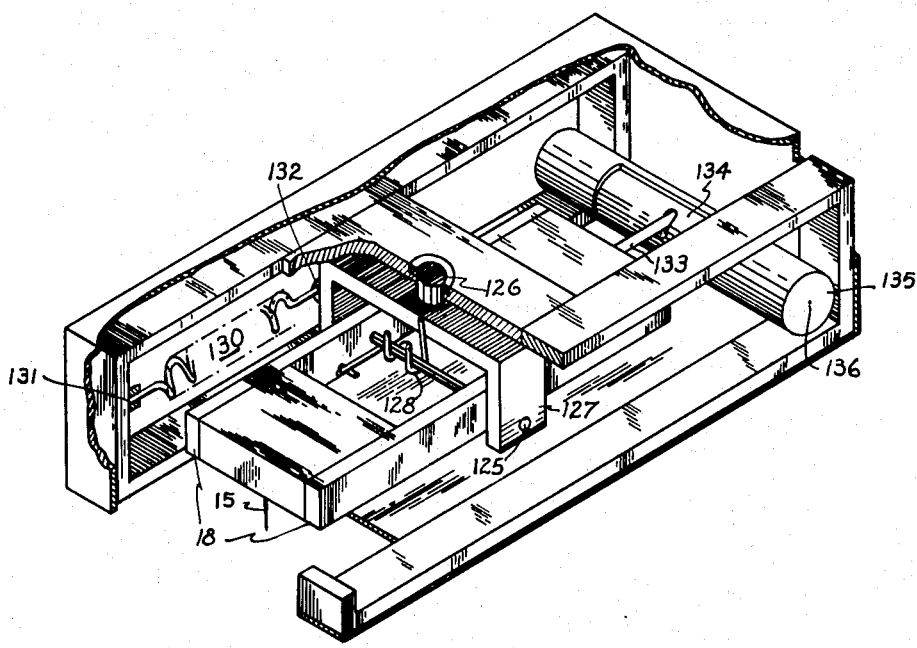
Fig. 7 is an isometric view partly in section of a modified probe unit.

Referring now to Fig. 7 there is illustrated a modification of the invention wherein the beam member 18 is gimbal-mounted for rotation on two shafts 125 and 126 oriented along mutually perpendicular axes. The beam 18 may conform in construction and operation with that above described in connection with Figs. 1–6 with the exception, however, that the frictional forces exerted on the tracer point 15 will be perpendicular in direction to those experienced in Figs. 2–4. The beam is supported on shaft 125 which is carried by a yoke 127. The tracer point 15 is urged against the surface under study by a coil spring 128 wound around shaft 125 and bearing against beam 18 at one end and yoke 127 at the other end. The shaft 126 supports the yoke 127 for a rotation about a vertical axis so that the tracer point sweeps through an arc whose center coincides with the axis of the shaft 126. Resilient means is provided for applying a force to the yoke 127 to produce rotation on shaft 126. The spring 130 in the embodiment illustrated in Fig. 7 performs the latter function. The spring is connected between the probe housing at the point 131 and suitable attaching means at point 132 on the yoke 127. When provided with reset means and latching means the beam may be rotated clockwise as seen in Fig. 7 to an initial position functionally corresponding to the left hand position of the carriage in Fig. 6 and may then be released for a rotational traverse in a counterclockwise direction.

In this system the beam 18 is also coupled, by way of a rod 133, to a piston 134 operatively enclosed in cylinder 135. A small air vent or pinhole such as the hole 136 is provided in each end of the cylinder for controlling the rate at which the beam 18 is permitted to rotate about the axis 126. While the rod is illustrated as merely inserted into an opening in the piston 134, it will be understood that an articulated connection may be provided to permit more freely the lateral movement of the pin 133 with the piston 134. In this embodiment it will be appreciated that the beam 18 preferably is initially dynamically balanced and that spring 128 provides the contacting force for the tracer point 15. The probe may be used in any position, being insensitive to orientation as was the system of Figs. 1–6. The electrical system associated with this probe may be identical with that illustrated in Fig. 6.

Figure 8:
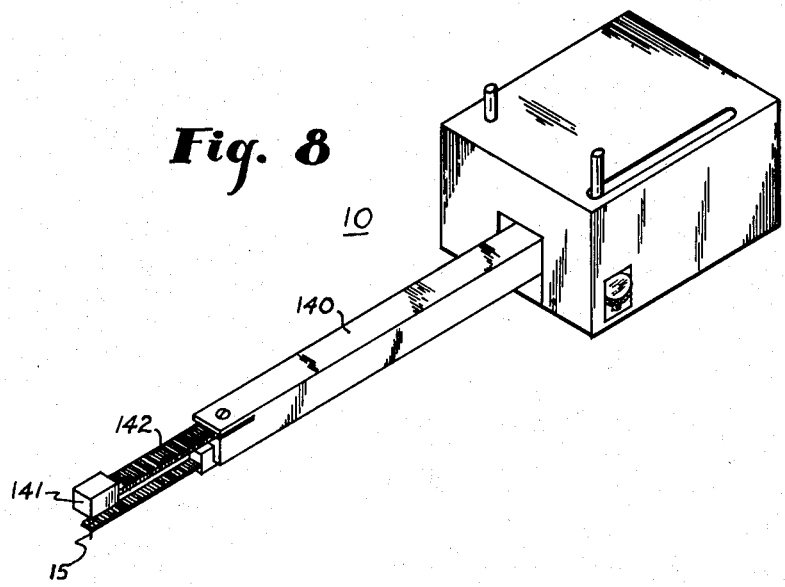
Fig. 8 illustrates a further modification.
Figure 9:
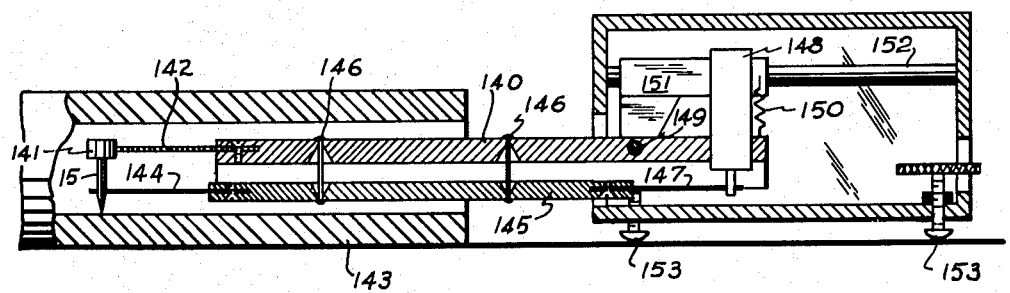
Fig. 9 is a more detailed sectional view of the unit of Fig. 8.

Referring now to Fig. 8, a further modification of the invention is illustrated wherein the probe 10 is provided with an extension which will be referred to as a snout 140 particularly adapted for the measurement of surfaces inside bores or otherwise inaccessible points. The snout 140 has at its extremity a tracer point 15 carried by a socket member 141 which in turn is supported by a spring 142. Such mounting permits motion of the point 15 normal to the surface which it contacts. Details of this modification will best be understood by reference to Fig. 9 where the snout is illustrated as projecting into a center-bored member 143. A resilient member such as a short leaf spring 144 is coupled to the tracer point near its lower end. The other end of the spring 144 is connected to a transmission bar 145. The bar 145 is supported as a part of the snout by resilient means such as rod spring 146. The other end of the transmission bar 145 is coupled by a leaf spring 147 to a transducer 148. The snout is mounted for rotation on shaft 149 and preferably is initially statically or dynamically balanced. A coil spring 150 connected between the snout structure and carriage member 151 urges the tracer point against the surface of the member 143. The carriage 151 is slidably mounted on two bars, one of which, the bar 152, is shown in Fig. 9. The carriage structure may be latched by means not shown in Fig. 9 in its left hand position and may be driven to its right hand position. The latter means may be substantially the same as incorporated in Figs. 2–4.

Thumb screws, having surface bearing feet 153, are provided to adjust the height of the point 15 above the surface to facilitate measurements of work pieces of varying thicknesses.

While the invention has been illustrated by several specific embodiments it is to be understood that further embodiments may now suggest themselves to those skilled in the art. It is intended to cover all such embodiments as fall within the scope of the appended claims.

What is claimed is:

1. A system for sensing variations in surface finish which comprises a tracer point positionable with its axis perpendicular to a test surface, supporting means rotatable about a first axis, means carried by said supporting means for coupling said tracer point to said supporting means and rotatable thereon about a second axis, means on said supporting means for maintaining substantially constant the pressure between said tracer point and said surface, means for bodily moving said supporting means over said surface in a direction perpendicular to said second axis to develop a frictional force on said tracer point proportional to the roughness of said surface thereby to tend to rotate said tracer point about said second axis, and electro-mechanical transducer means coupled to said tracer point to oppose and sense the rotational forces on said tracer point relative to said second axis for producing an output indication proportional to the roughness of said surface.

2. A system for sensing variations in surface finish which comprises a tracer point positionable with its axis perpendicular to a test surface, supporting means rotatable about a first axis which passes through the center of gravity of said supporting means, means carried by said supporting means for coupling said tracer point to said supporting means and rotatable thereon about a second axis, means on said supporting means for maintaining substantially constant the pressure between said tracer point and said surface, means for bodily moving said supporting means over said surface in a direction perpendicular to said second axis to develop a frictional force on said tracer point proportional to the roughness of said surface to rotate said tracer point about said second axis, and electro-mechanical transducer means mounted on said supporting means and coupled to said tracer point to sense the rotation of said tracer point about said second axis for producing an output indication proportional to the roughness of said surface.

3. A system for sensing variations in surface finish which comprises a tracer point positionable with its axis perpendicular to a test surface, supporting means for said tracer point rotatable about a first axis parallel to said surface, means coupled to and carrying said supporting means for rotation of said tracer point about a second axis, means for maintaining substantially constant the pressure between said tracer point and said surface, means for propelling said tracer point and its supporting means over said surface in a direction perpendicular to said second axis to develop a frictional force on said tracer point proportional to the roughness of said surface which tends to rotate said tracer point about said second axis, and electro-mechanical transducer opposing rotation of said tracer point about said second axis for producing an output indication proportional to said frictional force and the roughnses of said surface.

References Cited in the file of this patent

UNITED STATES PATENTS

| 2,171,433 | Powers | Aug. 29, 1939 |
| 2,240,278 | Abbott | Apr. 29, 1941 |
| 2,405,133 | Brown | Aug. 6, 1946 |

FOREIGN PATENTS

| 964,293 | France | Jan. 25, 1950 |